United States Patent [19]

Brun et al.

[11] Patent Number: 5,034,356

[45] Date of Patent: Jul. 23, 1991

[54] CERAMIC MATRIX COMPOSITE

[75] Inventors: Milivoj K. Brun, Ballston Lake; Brady A. Jones, Scotia, both of N.Y.

[73] Assignee: General Electric Company, Schenectady, N.Y.

[21] Appl. No.: 390,132

[22] Filed: Aug. 7, 1989

[51] Int. Cl.$^5$ .............................................. C04B 35/80
[52] U.S. Cl. ...................................... 501/95; 501/97; 501/99; 264/60
[58] Field of Search ........................ 501/35, 92, 95, 97, 501/99; 264/60, 63

[56] References Cited

U.S. PATENT DOCUMENTS

| | | |
|---|---|---|
| 4,528,275 | 7/1985 | Hodge . |
| 4,540,674 | 9/1985 | Watanabe et al. ............... 501/97 |
| 4,542,109 | 9/1985 | Pasto .................................. 501/97 |
| 4,585,500 | 4/1986 | Minjolle et al. ................... 156/89 |
| 4,689,188 | 8/1987 | Bhatt ................................. 264/60 |
| 4,781,993 | 11/1988 | Bhatt . |
| 4,855,262 | 8/1989 | Richon et al. .................... 501/92 |
| 4,886,682 | 12/1989 | Singh et al. ..................... 427/56.1 |
| 4,915,760 | 4/1990 | Singh et al. ...................... 156/89 |

OTHER PUBLICATIONS

Shetty, D. K. et al., "SiC Monofilament-Reinforced Si-3N-4 Matrix Composites", Ceramic Engineering & Science Proceedings, vol. 6, No. 7-8 (1985), pp. 632-645.

Abstract (74-SI-89), p. 27, 91st Annual Meeting American Ceramic Society, Apr. 1989.

*Primary Examiner*—William R. Dixon, Jr.
*Assistant Examiner*—Chris Gallo
*Attorney, Agent, or Firm*—James Magee, Jr.; James C. Davis, Jr.

[57] ABSTRACT

A ceramic composite is produced wherein the matrix is comprised of silicon nitride and cordierite and the reinforcing phase is comprised of Si-C-containing fibers.

18 Claims, No Drawings

CERAMIC MATRIX COMPOSITE

The present invention is directed to the production of a composite comprised of a ceramic matrix comprised of silicon nitride and cordierite which is reinforced with Si-C-containing fibers.

Composites comprised of a ceramic matrix and a fiber-reinforcing phase, i.e. ceramic matrix composites, are considered for high temperature structural applications beyond operating temperatures of metal alloys. The main disadvantage of ceramic structural materials is their low fracture toughness. Ceramic matrix composites derive their higher fracture toughness from the fiber pullout, while retaining capability to operate at high temperatures. It is imperative, consequently to be able to control fiber pullout in these materials.

One of the main factors affecting the fiber pullout is the thermal expansion of fiber and the matrix. For a successful composite both longitudinal and radial thermal expansion have to be considered. The expansion in the radial direction determines whether the fibers will be clamped by the matrix. If the thermal expansion of the fiber is higher than that of the matrix, the fiber will tend to pull away from the matrix on cooling from processing temperature, promoting easier fiber pullout. When the expansion of the matrix is higher than that of the fibers, the matrix will clamp fibers during cooling and fiber pullout will be more difficult.

Longitudinal thermal expansion determines the final state of stress in the finished composite. If the fibers shrink more on cooling, they will be in tension, and put matrix in compression, which would result in raising the critical stress for initial matrix cracking. If the matrix shrinks more than the fiber, it will end up in tension, which is undesirable.

Silicon carbide fibers are a possible reinforcement for ceramic matrix composites. Monolithic silicon carbide has a coefficient of thermal expansion which is very low, i.e. it is about $4.5 \times 10^{-6}/°K$. Since it is desirable to have a matrix with still lower thermal expansion, the choice of possible matrices is very limited. Silicon nitride has a low thermal expansion coefficient of about $3.5 \times 10^{-6}/°K$., and is already a good structural material in monolithic form. However, it was shown that oxide sintering additives, such as alumina and yttria made $Si_3N_4$ thermal expansion higher than that of silicon carbide.

The present invention enables the production of a composite wherein the thermal expansion of the matrix can be tailored to match the fibers and avoid excessive mismatch both at room and high temperatures. In the present invention, cordierite is used as a sintering additive for silicon nitride.

Cordierite is comprised of a magnesium aluminum silicate with the formula of or about $2MgO.2Al_2O_3.5SiO_2$, i.e. about 13.7 weight % MgO, about 34.9 weight % $Al_2O_3$ and about 51.4 weight % $SiO_2$. Crystalline cordierite has a thermal expansion coefficient of about $2.0 \times 10^{-6}/°K$.

Briefly stated, in one embodiment, the present composite is comprised of a ceramic matrix and at least a layer of a plurality of continuous Si-C-containing fibers embedded in said matrix, said Si-C-containing fibers comprising at least about 10% by volume of said composite, each said Si-C containing fiber having a diameter greater than about 5 microns and a length at least ten times its diameter, more than 90% by volume of said fibers in each layer being spaced from each other and being at least substantially parallel to each other, said matrix being comprised of a mixture of silicon nitride and cordierite wherein the cordierite ranges from about 1% to about 50% by weight of the mixture, said composite having a porosity of less than about 5% by volume, said composite containing no significant amount of reaction product of said fibers and said matrix, said matrix having a thermal expansion coefficient which ranges from lower than that of said fibers to less than about 15% higher than that of said fibers.

Briefly stated, the present process for producing a composite comprised of a ceramic matrix and at least a layer of a plurality of continuous Si-C-containing fibers comprises forming a slurry of a matrix-forming material comprised of a particulate mixture of silicon nitride and a member selected from the group consisting of cordierite, a cordierite-forming composition, and combinations thereof wherein said member ranges from about 1% to about 50% by weight of said particulate mixture, providing at least a layer of a plurality of continuous fibers comprise of a Si-C containing material containing at least about 50% by weight of silicon and at least about 25% by weight of carbon, producing a wet preform comprised of said fibers coated with the wet solids of said slurry wherein the coated fibers in each layer are substantially parallel to each other and wherein the coatings prevent significant direct contact between the fibers, drying said wet preform to produce a dry preform comprised of said matrix-forming material and said fibers, and compressing the resulting preform or a sample thereof under a sufficient pressure at a temperature sufficient to generate sufficient liquid phase to sinter said silicon nitride and produce said composite having a porosity of less than about 5% by volume, said composite containing no significant amount of reaction product of said fibers and said matrix, said matrix having a thermal expansion coefficient which ranges from lower than that of said fibers to less than about 15% higher than that of said fibers, at least about 10% by volume of said composite being comprised of said fibers.

In one embodiment of the present process, the matrix-forming material is comprised of a ceramic particulate mixture of silicon nitride and cordierite or a cordierite-forming composition. Generally, a cordierite-forming composition comprised of $Al_2O_3$, MgO and $SiO_2$ is used. In the present process, the cordierite-forming composition forms cordierite in situ at an elevated temperature ranging to sintering temperature. Generally, the cordierite or cordierite-forming composition ranges from about 1% to about 50% by weight, frequently from about 5% to about 25% by weight, of the particulate mixture. The particular amount of cordierite or cordierite-forming composition used depends largely on the particular composite desired and is determined empirically.

In the present process, the matrix-forming ceramic particulate mixture undergoes a liquid phase sintering. The particulates are of a size which permits the production of the present composite and can be determined empirically. Preferably, silicon nitride in its longest dimension has an average size of less than 8 microns and the average size of the remaining particulate mixture is less than 2 microns.

In another embodiment of the present invention, the matrix-forming material is comprised of a blend of the matrix-forming ceramic particulates and silicon carbide whiskers to produce a matrix with significantly increased toughness. The whiskers are crystalline and stable in the present process. The whiskers are of a size which permits the production of the present composite and can be determined empirically. Generally, they are less than about 50 microns in length and less than about 5 microns in diameter. Generally, the whiskers range up to about 30% by weight, frequently from about 10% to about 25% by weight, of the matrix-forming material.

In carrying out the present process, the matrix-forming material is admixed with a liquid to form a slurry. The liquid vehicle used in forming the slurry is a liquid at about room temperature and atmospheric pressure in which the matrix-forming material can be effectively dispersed. Generally, the liquid vehicle is one which evaporates away at about atmospheric pressure or under a partial vacuum at a temperature ranging from about room temperature to about 100° C. leaving no residue or no residue detectable by x-ray diffraction analysis. Preferably, the liquid vehicle has a boiling point ranging from greater than about 30° C. to about 100° C. at about atmospheric pressure. Representative of suitable liquid vehicles are water, methyl alcohol, ethyl alcohol, isopropyl alcohol, ethylene glycol, and mixtures thereof.

Frequently, a deflocculant may be used, if desired, in forming the slurry. Generally, the deflocculant is an organic material and should be soluble in the liquid vehicle. The deflocculant need only be used in an amount which effectively aids in dispersing the matrix-forming material and such amount is determinable empirically. Generally, the deflocculant is used in an amount of less than about 1% by volume of the total volume of liquid vehicle. Representative of useful deflocculants are oleic acid and tetramethyl ammonium hydroxide.

Frequently, the slurry contains known bonding means in the form of an organic polymer, such as, for example, epoxy resin, to aid in forming the coatings or wet preform. The particular amount of organic polymer binder is determined empirically and generally it is less than about 10% by weight of the matrix-forming material. Generally, the organic polymer binder is soluble in the liquid vehicle. Any deflocculants, binders, or similar materials used in forming the slurry or preform should have no significant deleterious effect in the present process. Such materials are of the type which evaporate away on heating at temperatures below the present sintering temperature, preferably below 500° C., leaving no deleterious residue and would be removed before the present compressing procedure.

As used herein, the term "slurry" includes slip and suspension.

The slurry can be formed in a conventional manner by mixing all of its components generally at about room temperature and atmospheric pressure. Generally, the slurry is formed by ball-milling the components.

The amount of matrix-forming material used in forming the slurry depends largely on the particular coating thickness of matrix-forming material desired on the fibers, and to some extent on the particular coating technique and can be determined empirically. Generally, the greater the concentration of matrix-forming material in the slurry, the thicker will be the resulting coating of matrix-forming material on the fibers. Generally, the matrix-forming material comprises at least about 15% by volume, frequently at least about 30% by volume, of the slurry. Preferably, the matrix-forming material is at least significantly or substantially uniformly dispersed in the slurry. The viscosity of the slurry can be adjusted by adjusting the concentration of matrix-forming material therein.

The present Si-C-containing fiber has a diameter greater than about 5 microns. Generally, the diameter of the fiber ranges from greater than about 5 microns to about 250 microns, frequently from about 10 microns to about 150 microns. The particular diameter of the fiber depends largely on the particular composite desired. The fiber is continuous and can be as long as desired. It has a minimum length of at least about 10 times its diameter, and generally, it is longer than about 1000 microns, or it is longer than about 2000 microns. The particular length of the fiber depends largely on the composite desired. Generally, the fibers extend at least substantially through a section of the final composite. Generally, the fibers are as long as the composite.

Preferably, the present fiber has in air at ambient or room temperature, i.e. from about 15° C. to about 30° C., a minimum tensile strength of about 100,000 psi and a minimum tensile modulus of about 25 million psi.

In the present invention, the Si-C-containing fibers can be amorphous, crystalline or mixtures thereof. The crystalline fibers can be single crystal or polycrystalline.

The Si-C-containing fiber is stable in the present process and has a melting or decomposition point which is above the particular processing temperature. It is comprised of a material which forms no significant amount of reaction product with the matrix in the resulting composite. Preferably, the Si-C-containing fiber forms no reaction product with the matrix in the resulting composite which is detectable by scanning electron microscopy.

The present fibers are comprised of a Si-C-containing material which contains at least about 50% by weight of silicon and at least about 25% by weight of carbon, based on the weight of the Si-C-containing material. Examples of Si-C-containing materials are silicon carbide, Si-C-O, Si-C-O-N, Si-C-O-Metal and Si-C-O-N-Metal, where O, N and Metal are each present in at least an amount of 1% by weight of the Si-C-containing material, and where the Metal component can vary but frequently is Ti or Zr. There are processes known in the art which use organic precursors to produce fibers which may introduce a wide variety of elements into the fibers.

The present fibers also include fibers wherein the Si-C-containing material, usually polycrystalline silicon carbide, envelops a core. Generally, such fibers are produced by chemical vapor deposition of silicon carbide on a core such as, for example, elemental carbon or tungsten.

In the present process, there is no loss, or no significant loss, of the matrix-forming material or Si-C-containing fibers.

In carrying out the present process, a wet preform is produced which can vary in moisture content wherein the fibers are coated with the slurry or wet matrix-forming material, wherein the coated fibers in each layer are substantially parallel to each other and wherein the wet coatings are in contact with each other sufficiently to enable the production of a dry preform useful for producing the present composite. Generally, in the wet preform the coatings prevent significant contact between the fibers, and preferably substantially all, or all, of the fibers are spaced from each other by the coatings.

Generally, the wet coatings leave no significant portion of the fibers forming the composite exposed.

The wet preform can be produced by a number of techniques. Generally, the wet preform is in the form of a sheet or tape.

In one technique, the fibers are dipped into the slurry to form the desired thickness of coating thereon, and deposited on a flat surface with the wet coatings in contact with each other to produce the wet preform in the form of a sheet.

In another technique, known in the ceramics art as filament-winding, a long fiber is pulled through the slurry to form the desired coating thereon and wound on a reel to produce the wet preform thereon in the form of a sheet.

In another embodiment, initially a preform of the fibers is made which can be produced by a number of conventional techniques. For example, the fibers can be uniaxially aligned and spaced by placing them in a suitable device provided with grooves and the desired spacing. The layer of fibers can be lifted off the device with adhesive tape placed across both ends of the fibers. The slurry can be deposited on the fibrous preform to coat the fibers by a number of conventional techniques such as, for example, vacuum casting, thereby producing the present wet preform.

Preferably, in the present process, the slurry is deposited on the fibers to form a significantly or substantially uniform coating thereon. Preferably, the coating on each fiber leaves no significant portion of the fiber exposed thereby preventing significant contact between the fibers in the resulting composite. The thickness of the deposited coating of wet matrix-forming material depends largely on the volume fraction of fibers desired in the final composite and is determined empirically.

The wet preform can be dried in any convenient manner which has no significant deleterious effect thereon. Generally, it is dried in air at about atmospheric pressure at a temperature ranging from room temperature to about 100° C. The presence of organic materials such as binders would require heating the preform to a temperature at which such material evaporates away, preferably below 500° C.

The resulting dry preform is comprised of composite-forming material and is compressed under a pressure and temperature and for a sufficient period of time to produce the present composite. Frequently, the dry preform is cut to produce a sample thereof, i.e. a desired preform, for compression. Frequently, the dry preform is in the form of a sheet or tape. Frequently, the dry preform or a sample thereof which is compressed herein is comprised of a plurality of sheets or tapes, one on top of the other, preferably substantially coextensive with each other, i.e. substantially in the form of a sandwich structure. The particular applied pressure, temperature and time are determinable empirically, and generally they are interdependent.

Compression temperature, i.e. sintering temperature, can vary depending largely on the composition of the matrix-forming material and to a lesser extent on the applied pressure and compression time. Generally, under higher applied pressures and longer times, lower sintering temperatures can be used. Likewise, under lower applied pressures and shorter times, higher sintering temperatures would be used. The compression, particularly sintering temperature and time period at sintering temperature, should have no significant deleterious effect on the fibers and should not result in any significant amount of reaction product between the fibers and the matrix in the resulting composite.

The compression or sintering temperature should be at least high enough to generate sufficient liquid to sinter the silicon nitride and produce the present composite and such temperature is determined empirically. Generally, all of the liquid is generated by cordierite. Generally, as the amount of cordierite is increased, the minimum temperature required for the present sintering and production of the composite is decreased. For example, with a cordierite content of about 1% by weight of the particulate mixture of silicon nitride and cordierite, the minimum sintering temperature may range from about 1650° C. to about 1700° C., whereas with a cordierite content of about 50% by weight of the particulate mixture, the minimum sintering temperature may be as low as about 1200° C. Generally, the sintering temperature used to produce the present composite ranges from about 1200° C. to about 1750° C., frequently from about 1300° C. to about 1650° C., or from about 1400° C. to about 1550° C. Generally, temperatures below about 1200° C. will not produce the present composite whereas temperatures above about 1750° C. may have a significantly deleterious effect on the Si-C containing fibers and may produce a significant amount of reaction product between the fibers and matrix in the final composite.

The present compression to produce the composite is carried out either by hot pressing or by hot isostatic pressing of the dry preform. Preferably, the dry preform, i.e. preform, is preheated to a temperature at which the matrix-forming material is sufficiently plastic, usually up to about 1000° C., to prevent abrasion of the fibers before the application of significant pressure.

HOT PRESSING EMBODIMENT

In this embodiment, the dry preform is hot pressed to produce the composite. Conventional hot pressing equipment may be used.

Generally, the applied pressure at the pressing, i.e. sintering, temperature ranges from about 1000 psi to a maximum pressure which is limited by the available pressing equipment. For the production of most composites, the applied pressure ranges from about 3000 psi to 10,000 psi. Thus for solid graphite dies the upper limit is about 5000 psi and for graphite fiber-wound dies the upper limit is about 10,000 psi. It is advantageous to use a pressure close to the maximum available because the application of such high pressure makes it possible to keep the pressing, i.e. sintering, temperature low enough to prevent any significant deleterious effect on the fibers. Generally, hot pressing in the present process is carried out in a period of time ranging up to about 30 minutes and longer periods of time usually do not provide any significant advantage.

Hot pressing is carried out in a non-oxidizing atmosphere. More particularly, it is carried out in a protective atmosphere in which the preform is substantially inert, i.e. an atmosphere which has no significant deleterious effect thereon. Representative of the hot pressing atmospheres is nitrogen, argon, helium, and mixtures thereof. Preferably, it is nitrogen. The hot pressing atmosphere generally can range from a substantial vacuum to about atmospheric pressure.

HOT ISOSTATIC PRESSING EMBODIMENT

Hot isostatic pressing may be carried out in a conventional manner. Generally, in carrying out this embodiment, the dry preform is totally confined, i.e. encapsulated, under vacuum, within an envelope of a suitable material. The vacuum is determined empirically and generally is below 0.1 torr. During hot isostatic pressing the encapsulating material is viscous and functions as a pressure- and heat-transmitting medium. The encapsulating material should have no significant deleterious effect on the resulting composite, and generally it is a glass, preferably fused silica. Hot isostatic pressing can also be carried out by encapsulating the preform in a metal can or container. Suitable metals may be molybdenum and tantalum.

Generally, before the application of significant pressure, to prevent cracking of the encapsulating material, the encapsulated preform is preheated to a temperature at which the encapsulating material is sufficiently viscous to be pressure-transmitting. Such preheated encapsulated preform is then hot isostatically pressed with a gas at superatmospheric pressure at a sintering temperature to produce the composite.

The isostatic pressing gas may be any gas which has no significant deleterious effect on the envelope. For example, the pressing gas can be selected from the group consisting of argon, helium, nitrogen and mixtures thereof.

Generally, gas pressure ranges from about 2000 psi, or from about 5000 psi, to the maximum attainable which generally is about 30,000 psi. The time period to carry out the present hot isostatic pressing depends largely on the temperature and pressure used and is determinable empirically with increasing temperature requiring less time. Typically, a temperature of about 1600° C. and a pressure of about 30,000 psi will require a time period of about 0.5 hour.

Generally, in this embodiment, a composite having a wide variety of shapes can be produced. For example, the preform can be produced in a desired shape by slip-casting. Also, before the present preform is dry, depending largely on its moisture content, it usually has sufficient mechanical strength to be handled and sufficient drapability which allows it to be draped around a mold and dried to produce a dry preform of desired configuration. The resulting structure is then hot isostatically pressed to produce the composite. The mold should be comprised of a material which has no significant deleterious effect on the composite and which can be removed from the resulting composite by known techniques, such as, for example, by dissolving it away with an acid which has no significant effect on the composite or by mechanical means, such as sand-blasting. As a result, the present composite produced by hot isostatic pressing can be in any form desired, such as, for example, it can be hollow and/or of simple shape and/or of complex shape.

Upon completion of hot pressing or hot isostatic pressing, the sample is cooled to produce a solid composite. The rate of cooling depends largely on the extent of crystalline cordierite desired in the composite. Generally, a very fast cooling or quenching of the sample produces amorphous cordierite. Generally, with decreasing rates of cooling, increasing amounts of cordierite crystallize. Frequently, the sample is cooled to room temperature, and more frequently it is furnace-cooled to room temperature, before it is recovered.

If desired, during cooling or after the sample is recovered, it may be annealed, i.e. held at an empirically predetermined elevated temperature, generally ranging from above 1000° C. to below the temperature at which liquid forms in the sample, for a sufficient period of time to crystallize the cordierite.

The present composite is comprised of Si-C containing fibers embedded in or within a matrix. The Si-C containing fibers are enveloped by matrix with or without their ends or end portions exposed. The matrix is continuous, interconnecting and in direct contact with the Si-C-containing fibers. The matrix leaves no significant portion of the Si-C containing fibers embedded therein exposed. The matrix is distributed through the Si-C-containing fibers and generally it is space filling or substantially completely space filling. Generally, the matrix envelopes or surrounds each Si-C-containing fiber of more than 90% by volume of the fibers, or more than 95% by volume of the fibers, and preferably all or substantially all of the Si-C-containing fibers.

The composite contains at least a single layer of the Si-C-containing fibers. Preferably, there is no significant contact between the fibers in a layer. In a composite containing a plurality of layers of Si-C-containing fibers, preferably there is no significant contact, or no contact between the layers and they are separated by matrix material. In each layer, preferably more than 90% by volume, or more than 95% by volume, of the Si-C-containing fibers, and preferably all or substantially all of the fibers are spaced from each other and parallel or at least substantially parallel to each other. The Si-C-containing fibers in one layer may or may not be parallel to the Si-C-containing fibers in another layer. Any misalignment of the Si-C-containing fibers should not significantly degrade the mechanical properties of the composite.

The Si-C-containing fibers comprise at least about 10% by volume of the composite. Generally, the Si-C-containing fibers range from about 10% by volume to about 70% by volume, frequently from about 20% by volume to about 60% by volume, or from about 20% by volume to about 40% by volume, of the composite.

In one embodiment of the present composite, the matrix is comprised of a mixture of silicon nitride and cordierite wherein the cordierite ranges from about 1% to about 50% by weight, frequently from about 5% to about 25% by weight, of the matrix. The silicon nitride is polycrystalline. Generally, the silicon nitride grains are elongated, usually having an average length in the longest dimension of less than 10 microns, frequently ranging from about 1 to 5 microns. The cordierite can be amorphous, crystalline or a combination thereof. Generally, in this embodiment, when the matrix contains about 1% by weight of cordierite, its thermal expansion coefficient is about $3.5 \times 10^{-6}/°K.$, and when it contains about 50% by weight of cordierite, its thermal expansion coefficient is about $3 \times 10^{-6}/°K.$ In another embodiment of the present composite, the matrix is comprised of a blend, i.e. mixture, of silicon nitride, cordierite and silicon carbide whiskers wherein the whiskers range up to about 30% by weight, frequently from about 10% to about 25% by weight of the matrix. In this embodiment, the cordierite ranges from about 1% to about 50% by weight, frequently from about 5% to about 25% by weight, of the mixture comprised of silicon nitride and cordierite.

In the present composite, the matrix has a thermal expansion coefficient which ranges from lower than that of the Si-C-containing fibers to less than about 15% higher than that of the fibers. Preferably, the matrix has a thermal expansion coefficient which is about the same as, or which is lower than, the thermal expansion coefficient of the Si-C-containing fibers. As a result, the Si-C-containing fibers impart significant toughness and prevent brittle fracture of the composite at room temperature. By brittle fracture of a composite it is meant herein that the entire composite cracks apart at the plane of fracture. In contrast to a brittle fracture, the present composite exhibits fiber pull-out on fracture at room temperature. Specifically, as the present composite cracks open, generally at least about 10% by volume, frequently at least about 30% or 50% by volume, and preferably more than 90% by volume, of the Si-C-containing fibers pull out and do not break at the plane of fracture at room temperature.

The present composite has a porosity of less than about 5% by volume, preferably less than about 1% by volume, of the composite. Most preferably, the composite is void- or pore-free, or has no significant porosity, or has no porosity detectable by scanning electron microscopy. Generally, any voids or pores in the composites are less than about 70 microns, preferably less than about 50 microns or less than about 10 microns, and they are distributed in the composite. Specifically, any voids or pores are sufficiently uniformly distributed through the composite so that they have no significant deleterious effect on its mechanical properties.

One particular advantage of this invention is that the composite can be produced directly in a wide range of sizes. For example, it can be as long or as thick as desired.

The present composite has a wide range of applications depending largely on its particular composition. For example, it is useful as a wear resistant part, acoustical part or high-temperature structural component.

The invention is further illustrated by the following examples where, unless otherwise stated, the procedure was as follows:

In Examples 1 to 3, the Si-C-containing fibers were comprised of commercially available continuous fibers of silicon carbide produced by a chemical vapor deposition process and sold under the trademark AVCO SCS-6. These fibers had a 35 micron carbon core on which polycrystalline silicon carbide was deposited to an overall diameter of about 145 microns. The outside surface of the fibers consisted of two layers of pyrolytic carbon and carbon-silicon, with overall thickness of about 3 microns. In air at room temperature these fibers have a tensile strength of about 500 thousand psi and a tensile modulus of about 60 million psi. These fibers have an average thermal expansion coefficient of less than about $4.5 \times 10^{-6}/°K$.

In Example 4, the Si-C-containing fibers were comprised of commercially available amorphous fibers sold under the trademark Nicalon which generally range in composition from about 57% by weight Si, 27% by weight C, 16% by weight O, to about 56% by weight Si, 34% by weight C, 10% by weight O, based on the weight of the fiber. These fibers had an average diameter ranging from about 10 microns to about 15 microns and were in the form of tow. The fibers had an average thermal expansion coefficient of less than about $4.4 \times 10^{-6}/°K$.

Before milling, the silicon nitride powder had an average particle size in its longest dimension of less than 1 micron. Also, before milling, the average particle size of the magnesium oxide powder was about 2 microns, of the aluminum oxide powder was about 0.3 microns, and of the silicon oxide powder was about 10 microns. These were highpurity powders (greater than 99% pure).

The SiC whiskers were crystalline and had an average diameter of about 0.3 micron and an average length of about 20 microns.

By room temperature herein, it is meant from about 15° C. to about 30° C.

Hot pressing was carried out in a 1.25 inch inner length 0.25 inch inner width die in an atmosphere of flowing nitrogen which was at about atmospheric pressure.

Standard techniques were used to characterize the composite for density and mechanical properties.

EXAMPLE 1

A powder mixture corresponding to a matrix composition of 80% by weight silicon nitride and 20% by weight cordierite was used. Specifically, 275 grams of silicon nitride, 7.3 grams of MgO, 18.6 grams of alumina, and 27.29 grams of silica, were ball milled in 204 grams of isopropanol alcohol in a polyethylene jar with alumina milling media for 45 hours at room temperature.

The Si-C-containing fibers were cut to a length of about 1.25 inches and dipped into a portion of the slurry to obtain a uniform wet slurry coating, then dried in air, and then dipped again into the slurry to deposit a second slurry coating thereon producing a total coating thickness of about 70 microns. The resulting coated fibers were laid, while damp, in an open hot pressing die parallel to each other with the coatings in contact with each other forming a sheet which contained about 25 fibers. The coatings prevented contact between the fibers. Seven more sheets were produced in this manner and laid on top of each other forming a sandwich-like structure.

The sample was dried in air at room temperature.

The dried sample was hot pressed at 1600° C. and 5 kpsi for 30 minutes, and then furnace cooled to room temperature.

The resulting composite was comprised of a matrix of silicon nitride and cordierite which contained 8 layers of the fibers embedded therein. The matrix was continuous and appeared to surround each fiber. The fibers appeared parallel to each other and spaced from each other and extended through the matrix. The matrix left no significant portion of the fibers exposed. The fibers comprised about 22% by volume of the composite.

The resulting composite had a density of 3.1 g/cm$^3$ and no detectable porosity.

When a sample of the composite was broken in three point bend test at room temperature, a tough composite behavior indicative of fiber pullout was obtained with maximum strength of 90 kpsi.

EXAMPLE 2

73.8 grams of the slurry produced in Example 1 were mixed with 5 grams of silicon carbide whiskers by ball milling for one hour in a polyethylene jar with alumina milling media at room temperature.

The Si-C-containing fibers were cut to a length of about 2 inches. Each fiber was positioned within the matching holes of two contacting aligned 60 mesh plastic sieves. The sieves were then spaced apart to enable securing of both ends of each fiber to them with a small amount of organic glue. The resulting assembly contained 10 layers of fibers with ten fibers in each layer and in each layer the fibers were parallel to each other and spaced from each other. Also, the layers of fibers were uniformly spaced from each other.

The assembly was placed in a vacuum casting mold, the slurry was poured over the assembly covering the entire assembly, and then it was vacuum cast. In the resulting assembly, all of the fibers were immersed in a mass of the wet matrix-forming material. The assembly was dried overnight in air at 100° C.

The resulting dried coated assembly was placed in a reaction bonded silicon nitride crucible and prefired to 1100° C. in a vacuum atmosphere of about 0.2 torr for about 30 minutes to remove any volatile components including the plastic sieves and then furnace cooled to room temperature.

The resulting dry preform was encapsulated under a vacuum of about 0.1 torr into a fused silica envelope which was heat-sealed by standard glass-blowing technique.

The envelope, i.e. encapsulated preform, was heated in a hot isostatic pressing furnace to 1400° C. under a gas pressure of 25 psi. The hot isostatic pressing gas was argon. At 1400° C., the fused silica was sufficiently viscous to be pressure-transmitting. The gas pressure was then slowly raised to 16 kpsi to collapse the envelope. The temperature was then raised to 1600° C., maintained for 30 minutes, and then the sample was furnace cooled to room temperature.

The resulting composite had no detectable porosity. The Si-C-containing fibers comprised about 25% by volume of the composite. The matrix was continuous and in direct contact wit the fibers and appeared to surround each fiber. The fibers appeared substantially parallel to each other and spaced from each other and extended through the matrix. Also, there appeared to be no contact between the layers of fibers.

At room temperature the composite exhibited a peak strength of 93 kpsi and tough composite behavior indicative of fiber pull-out.

Fiber pull-out was confirmed by scanning electron microscopy.

From other work, it was known that the matrix had a thermal expansion coefficient which was lower than that of the fibers.

EXAMPLE 3

A powder mixture corresponding to a matrix composition of 90% by weight silicon nitride and 10% by weight cordierite was used. Specifically 155 grams of silicon nitride, 1.84 grams of magnesium oxide, 4.64 grams of aluminum oxide, and 6.82 grams of silica were mixed in 170 grams of ethylene glycol in a polyethylene jar with alumina milling media for 32 hours at room temperature.

230 grams of the resulting slurry was mixed with 36.4 grams of silicon carbide whiskers and 50 grams of isopropanol for an additional hour at room temperature.

The resulting suspension was then slip cast over an array of fibers similar to that disclosed in Example 2, followed by drying, prefiring and encapsulating as disclosed in Example 2.

The hot isostatic procedure was the same as disclosed in Example 2.

The resulting composite was fully dense. At room temperature, it had a peak strength of 135 kpsi and exhibited a fracture energy of about 30kJ/m$^2$.

Scanning electron microscopy confirmed extensive fiber pullout. From other work, it was known that the thermal expansion coefficient of the matrix was lower than that of the fibers.

EXAMPLE 4

A powder composition corresponding to a matrix composition of 80% by weight silicon nitride and 20% by weight cordierite was used. Specifically, 137.6 grams of silicon nitride, 3.7 grams of magnesium oxide, 9.3 grams of aluminum oxide, and 13.7 grams of silicon dioxide were ball milled overnight at room temperature in a plastic jar with alumina balls and isopropanol liquid medium.

Amorphous silicon carbide fibers (Nicalon) in the form of tow were pulled through the suspension so that the fibers were coated with the slurry and wound on a take-up reel. The take-up reel was translated sideways at uniform speed to wind the fiber tows at constant spacing.

The liquid was evaporated from the wet coated tows in air at room temperature. The resulting dried wound layer of coated fibers, i.e. dry preform, was removed from the reel in the form of a sheet of fibers coated with matrix particles. It appeared that the fibers were substantially parallel to each other and spaced from each other by the coatings.

The sheet was cut into rectangular pieces 1.25 inch ×0.25 inch which were then stacked on top of each other to form a preform in a graphite hot pressing die, lined with Grafoil. The resulting sample was comprised of six pieces which were substantially coextensive with each other, i.e. they formed a layered sandwich-like structure.

The sample was hot pressed at 1400° C. and 5000 psi pressure for 10 minutes and then furnace cooled to room temperature.

The fibers comprised more than 20% by volume of the composite. The resulting composite had no detectable porosity. At room temperature, the strength of the composite was 60 kpsi, and the composite exhibited fibrous failure mode. From other work, it was known that the matrix had a thermal expansion coefficient lower than that of the fibers.

EXAMPLE 5

A portion of the slurry produced in Example 1 was poured into an open hot pressing die and dried in air at room temperature. The resulting particulate mixture was hot pressed at 1600° C. and 5 kpsi for 30 minutes, and then furnace cooled to room temperature.

The resulting ceramic was placed in a dilatometer and its thermal expansion coefficient was determined to be $3.2 \times 10^{-6}$/°K.

What is claimed is:

1. A process for producing a solid composite comprised of a ceramic matrix and at least a layer of a plurality of continuous Si-C-containing fibers which comprises forming a slurry of a matrix-forming material comprised of a particulate mixture of silicon nitride and a member selected from the group consisting of cordierite, a cordierite-forming composition, and combinations thereof wherein said member ranges from 1% to 50% by weight of said particulate mixture, providing at least a layer of a plurality of continuous fibers comprised of a Si-C containing material containing at least 50% by weight of silicon and at least 25% by weight of carbon based on the weight of said Si-C containing material, producing a wet preform comprised of said fibers coated with the wet solids of said slurry wherein the coated fibers in each layer are substantially parallel to each other and wherein the coatings prevent significant direct contact between the fibers, drying said wet preform to produce a dry preform comprised of said matrix-forming material and said fibers, and hot compressing the resulting preform or a sample thereof under a sufficient pressure at a temperature sufficient to generate sufficient liquid phase to sinter said silicon nitride and produce a sintered product, said compression temperature ranging from 1200° C. to 1750° C., and cooling said sintered product producing said solid composite, said composite having a porosity of less than 5% by volume, said composite containing no significant amount of reaction product of said fibers and said matrix, said matrix having a thermal expansion coefficient which is lower than that of said fibers, at least 10% by volume of said composite being comprised of said fibers.

2. The process according to claim 1, wherein said cordierite ranges from 5% to 25% by weight of said particulate mixture.

3. The process according to claim 1, wherein said Si-C-containing material is selected from the group consisting of silicon carbide, Si-C-O, Si-C-O-N, Si-C-O-Metal, Si-C-O-N-Metal, and mixtures thereof, wherein said O, N and metal are each present at least in an amount of 1% by weight of said Si-C-containing material.

4. The process according to claim 1, wherein said Si-C-containing material surrounds a core.

5. The process according to claim 1, wherein said fibers have a diameter greater than about 5 microns.

6. The process according to claim 1, wherein said matrix-forming material includes silicon carbide whiskers in an amount ranging to about 30% by weight of said matrix-forming material.

7. The process according to claim 1, wherein said Si-C containing material is comprised of silicon carbide.

8. The process according to claim 1, wherein said hot compressing is carried out by hot pressing.

9. The process according to claim 1, wherein said resulting preform or a sample thereof is encapsulated within a material which is pressure- and heat-transmitting at said compression temperature, wherein said hot compression is carried out by hot isostatic pressing, and wherein said encapsulating material has no significant deleterious effect on said composite.

10. A composite comprised of a ceramic matrix and a plurality of layers of continuous Si-C-containing fibers embedded in said matrix with no significant contact between said layers of fibers, said matrix leaving no significant portion of said Si-C-containing fibers embedded therein exposed, each said layer being comprised of a plurality of said continuous fibers, said Si-C-containing fibers comprising at least 10% by volume of said composite, said fibers being comprised of an Si-C-containing material containing at least 50% by weight of silicon and at least 25% weight of carbon based on the weight of said Si-C-containing material, each said Si-C-containing fiber having a diameter greater than 5 microns and a length at least ten times its diameter, said continuous fibers having a length greater than 1000 microns, more than 90% by volume of said fibers in each layer being spaced from each other and being at least substantially parallel to each other, said matrix being comprised of a mixture of silicon nitride, cordierite, and silicon carbide whiskers, said cordierite ranging from 1% to 50% by weight of the total amount of said silicon nitride and said cordierite, said whiskers ranging to 30% by weight of said matrix, said matrix being continuous and in direct contact with said fibers, said composite having a porosity of less than 5% by volume, said composite containing no significant amount of reaction product of said fibers and said matrix, said matrix having a thermal expansion coefficient which is lower than that of said fibers, said fibers preventing brittle fracture of said composite at a temperature ranging from 15° C. to 30° C.

11. The composite according to claim 10, wherein said cordierite ranges from 5% to 25% by weight of the amount of said silicon nitride and cordierite.

12. The composite according to claim 10, wherein said Si-C-containing material is comprised of a material selected from the group consisting of silicon carbide, Si-C-O, Si-C-O-N, Si-C-O-Metal, Si-C-O-Metal and mixtures thereof, wherein said O, N and Metal are each present at least in an amount of 1% by weight of said Si-C-containing material.

13. The composite according to claim 10, wherein said Si-C-containing material surrounds a core.

14. The composite according to claim 10, wherein said Si-C-containing material is comprised of silicon carbide.

15. The composite according to claim 10, which contains a plurality of layers and said fibers in a layer extend in a direction different from that of the fibers in another of said layers.

16. The composite according to claim 10, wherein said silicon carbide whiskers range from 10% to 25% by weight of said matrix.

17. The process according to claim 1, wherein said Si-C-containing material envelops a core.

18. The composite according to claim 10, wherein said Si-C-containing material envelops a core.

* * * * *